US005907613A

United States Patent [19]
Korn

[11] Patent Number: 5,907,613
[45] Date of Patent: May 25, 1999

[54] TELEPHONE SILENCING SYSTEM

[75] Inventor: Lawrence D. Korn, Farmington Hills, Mich.

[73] Assignee: I.P. International, Inc., Cayman Islands

[21] Appl. No.: 08/960,496

[22] Filed: Oct. 29, 1997

[51] Int. Cl.$^6$ .................... H04M 1/00; H04M 11/00
[52] U.S. Cl. .............. 379/373; 379/102.01; 379/442
[58] Field of Search ...................... 379/188, 199, 379/373, 355, 110.01, 102.01, 442; 455/344, 352

[56] References Cited

U.S. PATENT DOCUMENTS

| | | | |
|---|---|---|---|
| 4,405,839 | 9/1983 | Groff | 379/188 |
| 4,480,154 | 10/1984 | Klee | 379/373 |
| 4,578,540 | 3/1986 | Borg et al. | 379/40 |
| 4,893,329 | 1/1990 | O'Brien | 379/88.23 |
| 4,924,499 | 5/1990 | Serby | 379/200 |
| 5,060,255 | 10/1991 | Brown | 379/88.22 |
| 5,131,030 | 7/1992 | Cameron | 379/373 |
| 5,317,632 | 5/1994 | Ellison | 379/188 |
| 5,333,190 | 7/1994 | Eyster | 379/375 |
| 5,467,388 | 11/1995 | Redd, Jr. et al. | 379/196 |
| 5,542,102 | 7/1996 | Smith et al. | 455/65 |
| 5,561,712 | 10/1996 | Nishihara | 379/355 |
| 5,570,415 | 10/1996 | Stretton et al. | 379/110.01 |
| 5,579,377 | 11/1996 | Rogers | 379/74 |
| 5,604,797 | 2/1997 | Adcock | 379/373 |
| 5,619,568 | 4/1997 | Miller | 455/566 |
| 5,812,648 | 9/1998 | Wanner | 379/142 |

*Primary Examiner*—Daniel S. Hunter
*Assistant Examiner*—Charles N. Appiah
*Attorney, Agent, or Firm*—Gifford, Krass, Groh, Sprinkle, Anderson & Citkowski, P.C.

[57] ABSTRACT

A telephone silencing system is provided for use with at least one telephone receiver and an external telephone line electrically connected with the telephone receiver. This system includes a switch electrically connected in series between the telephone line and the telephone receiver. The switch is actuatable between a closed position, in which the telephone receiver(s) is connected to the telephone line, and an open position, in which the telephone receiver(s) is electrically disconnected with the telephone line. A receiver is operatively connected with the switch actuated between a closed and open position in response to a preset signal. A transmitter, in turn, when actuated, generates the preset signal to the receiver to thereby actuate the switch between its closed and open position.

2 Claims, 1 Drawing Sheet

TELEPHONE SILENCING SYSTEM

BACKGROUND OF THE INVENTION

1. Field of the Invention

The present invention relates to a telephone silencing system.

2. Description of the Prior Art

Most homes, apartments, and other dwellings include one or more telephone receivers. These telephone receivers are electrically connected by wires to an external telephone line. The external telephone line, in turn, is connected with the local telephone system.

When an incoming call is routed to a particular dwelling, a 90 volt AC signal is generated on the telephone line to the telephone receiver(s) in the home. The telephone receiver in response to the 90 volt AC "ring" signal actuates a beeper, ringer or other audible signal to signify an incoming call.

In some situations, however, an incoming telephone call is simply not desired. For example, incoming telephone calls are often times not desired in early morning hours when the occupants of the home are sleeping. Similarly, incoming telephone calls may not be desired during other special time periods, for example, the dinner hour, while watching movies and the like.

SUMMARY OF THE PRESENT INVENTION

The present invention provides a telephone silencing system which overcomes all of the above mentioned problems.

In brief, the telephone silencing system of the present invention comprises a normal closed switch which is electrically connected in series between the exterior telephone line and the one or more telephone receivers contained within the dwelling. This switch, furthermore, is preferably an electronic switch.

A receiver is associated with the switch to selectively actuate the switch between a closed position and an open position. The receiver may be responsive to radio signals, infrared signals and/or the like.

The system further comprises a transmitter, which, when activated, transmits the preset signal to the receiver. The transmitter, of course, will be a radio transmitter, infrared transmitter, and/or the like, depending upon the type of receiver used.

In one embodiment of the invention, a timer is also associated with the electronic switch to reset the switch from its open position to its closed position after a predetermined time period following actuation from the switch from its closed and to its open position.

In a further embodiment of the invention, the subsequent activation of the transmitter actuates the switch from its open and back to its closed position.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
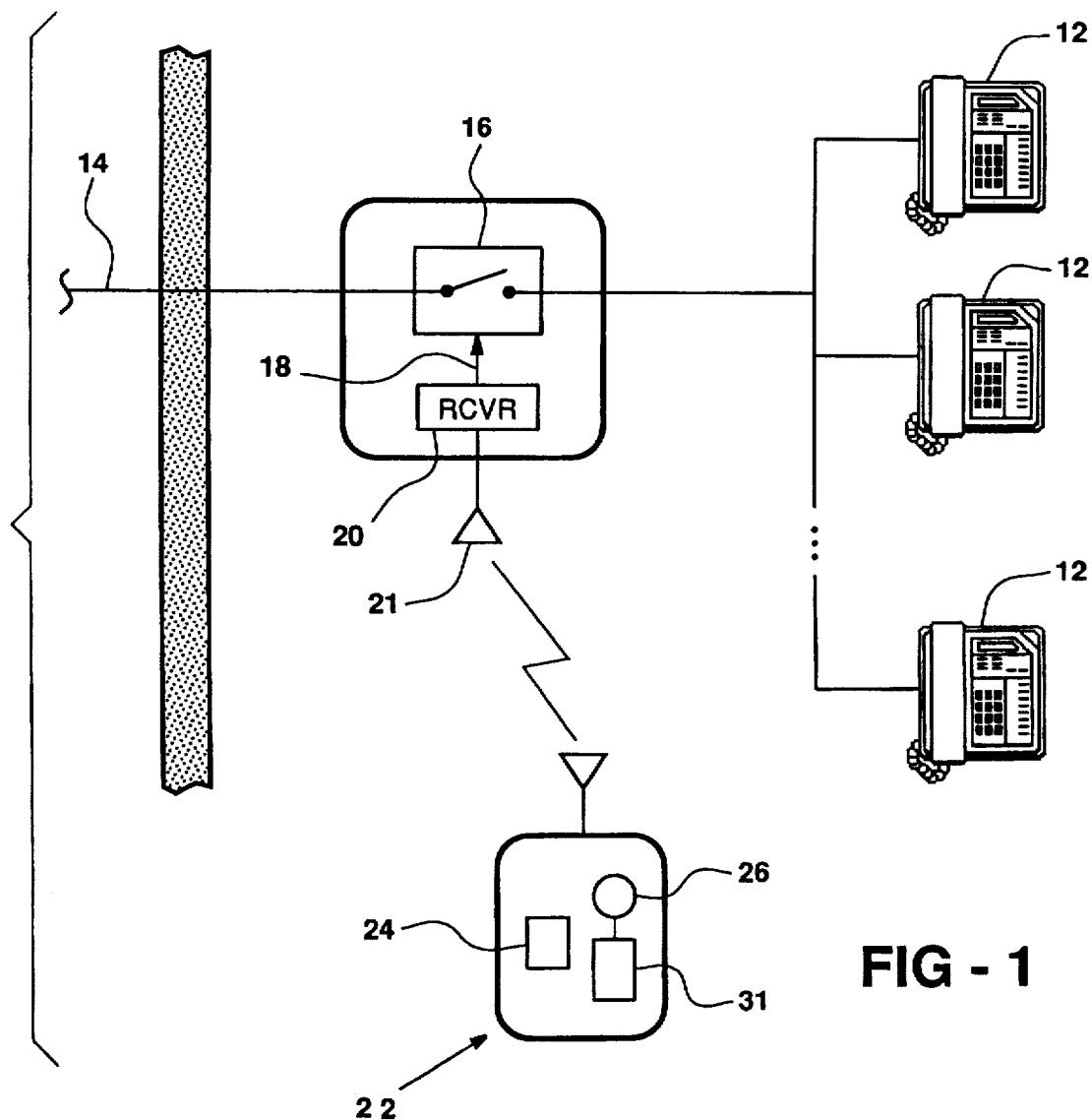
FIG. 1 is a diagrammatic view illustrating a first preferred embodiment of the present invention.

With reference first to FIG. 1, a preferred embodiment of the telephone silencing system 10 of the present invention is there shown for use with a dwelling or the like having one or more telephone receivers 12. The telephone receivers 12 are electrically connected in a fashion to be subsequently described in greater detail through the telephone silencing system 10 to an external telephone line 14 which in turn is connected to the local telephone network.

The telephone silencing system 10 comprises a switch 16 which is electrically connected in series between the telephone line 14 and the telephone receivers 12. The switch 16 is actuatable between an open position and a closed position. In the closed position, the switch 16 electrically connects the telephone line 14 to the receivers 12 so that the receivers 12, together with their ringers, operate in the normal fashion. Conversely, when the switch 16 is moved to its open position, the telephone line 14 is electrically disconnected from the receivers 12 thus rendering the ringers at the receivers 12 inoperable.

The switch 16 is preferably an electronic switch of any well-known construction and responsive to a control signal on an input line 18. In order to actuate the switch 16, the system 10 includes a receiver 20 having an output line electrically connected to the switch control input 18.

The receiver 20 is preferably a radio receiver, but alternatively may comprise an infrared receiver or the like. In response to the receipt of a preset signal on its antenna 21 the receiver 20 generates an output control signal to the switch 16 via the line 18 in order to toggle the switch 16 between an open and a closed position.

Still referring to FIG. 1, the system 10 further comprises a transmitter 22 which, when actuated via button 24 or the like, generates the preset signal to the receiver 20. A transmitter 22 also optionally includes a light indicator 26 which is illuminated whenever a disconnect preset signal has been transmitted by the transmitter 24 to the receiver 20.

The receiver 22 may comprise a radio receiver, infrared receiver or the like. The only requirement of the transmitter 22 is that it transmit the preset signal which is compatible with the receiver 20.

In operation and assuming that the switch 16 is in its closed position, the exterior telephone line 14 is electrically connected with the telephone receivers 12 such that the receiver(s) 12 operate in the normal fashion. At this time, the light indicator 26, if present, on the transmitter 22 is not illuminated.

Whenever disconnection of the telephone receiver(s 12 is desired, the transmitter 22 is activated by depressing the button 24. At that time, the transmitter 22 generates the preset signal to the receiver 20. The receiver 20 in response to the preset signal, generates an output signal on line 18 to the switch 16 to actuate the switch 16 to its open position. In doing so, all of the receivers 12, together with their ringers, are effectively disconnected from the telephone line 14.

Once the transmitter 22 has been activated to effectively disconnect the telephone receivers 12 from the telephone line 14, the light 26, if present, is illuminated by a latch circuit 31 in the transmitter 22 thus alerting the user that the telephone receiver(s) 12 are temporarily inoperable. When operation of the telephone receivers 12 is again desired, the transmitter 22 is again activated thereby generating the preset signal to the receiver 20. In response to the second preset signal, the receiver 20 again toggles or actuates the switch 16 to move the switch back to its closed position thereby reconnecting the telephone receivers 12 to the telephone line 14. Simultaneously, the toggle circuit 31 if present, is reset, so that the light 26 is turned off.

The actual telephone line 14 may be either a single or a multi-line connection. In the event that multiple telephone lines are provided to the dwelling, the switch 16 is merely replaced by a dual or even multiple switches, all responsive to the output signal from the receiver 20, with one switch 16 being connected to each of the multiple telephone lines.

Figure 2:
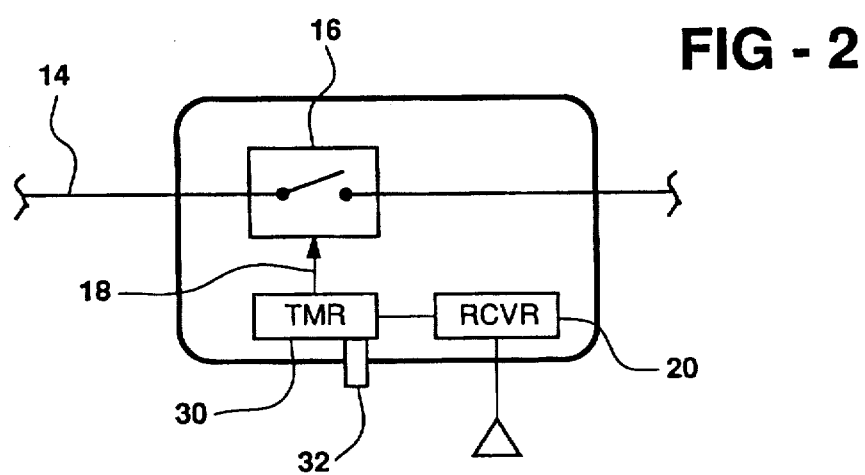
FIG. 2 is a diagrammatic view illustrating a second preferred embodiment of the present invention.

With reference to FIG. 2, a modification of the present invention is there shown in which a timer circuit 30 is operatively connected between the switch control line 18 and the output from the receiver 20. Once actuated by the receiver 20, the timer circuit 30 generates an output signal to the switch control line 18 to actuate the switch 16 to an open position for a preset period of time. Thereafter, the timer circuit 30 resets the switch 16 to its closed position thus restoring the telephone receivers to their operative condition. The provision of the timer 30 thus prevents a user from disconnecting the telephone receivers 12 and thereafter forgetting to reconnect the receivers 12 to the telephone line 14 when incoming telephone calls are desired.

Still referring to FIG. 2, the system optionally includes a manual override 32 which, when manually actuated, resets the switch 16 to its closed position. In practice, depressing of the manual switch 32 generates an output signal similar to the output signal from the timer circuit 30 to the switch 16.

In the foregoing, it can be seen that the present invention provides a simple and totally effective means for temporarily silencing telephone receivers in the dwelling when incoming calls are not desired.

Having described my invention, however, many modifications thereto will become apparent to those skilled in the art to which it pertains without deviation from the spirit of the invention as defined by the scope of the appended claims.

I claim:

1. A telephone silencing system for use with a plurality of remotely located telephone receivers and an external telephone line electrically connected with each of said telephone receivers, the system comprising:

an electronic switch electrically connected in series between the telephone line and each of said telephone receivers, said switch being actuatable between a closed position in which said telephone line is electrically connected with said telephone receivers and an open position in which said telephone line is electrically disconnected from said telephone receivers, a radio receiver responsive to a preset signal to generate a predetermined output signal, means responsive to said predetermined output signal to actuate said switch from one of said closed and said open positions to the other of said closed and open positions, a radio transmitter remotely operable from said radio receiver for generating said preset signal, and a light in said radio transmitter which is illuminated when said switch is in said open position.

2. The invention as defined in claim 1 and comprising timer means connected to said actuating means for resetting said switch to said closed position after a predetermined time period following actuation of said switch from said closed to said open position.

* * * * *